T. PENDERGAST.
Horse-Car Pole.
No. 85,473.
Patented Dec. 29, 1868.
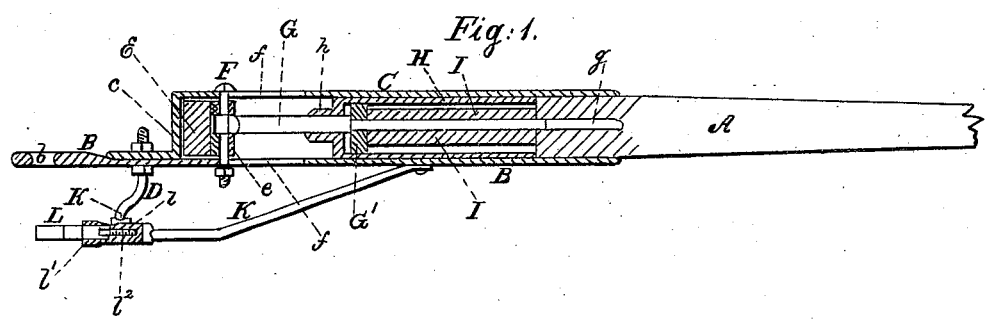
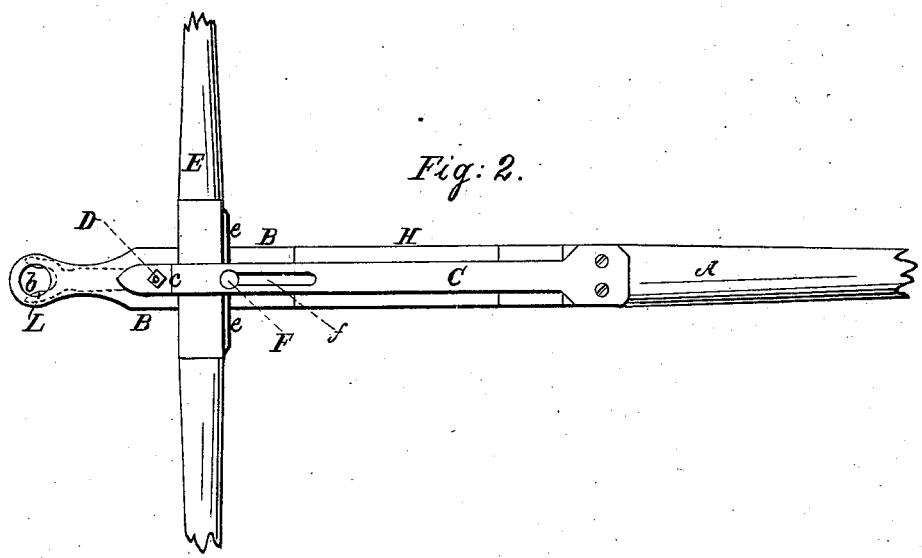
Witnesses:
Robert Burns
Wm. H. Herthel
Inventor:
T. Pendergast by his atty's
Herthel & Co

TIMOTHY PENDERGAST, OF ST. LOUIS, MISSOURI.

Letters Patent No. 85,473, dated December 29, 1868.

IMPROVED POLE FOR HORSE-CARS.

The Schedule referred to in these Letters Patent and making part of the same.

*To all whom it may concern:*

Be it known that I, TIMOTHY PENDERGAST, of St. Louis, in the county of St. Louis, and State of Missouri, have made certain new and useful Improvements in Car-Poles; and I do hereby declare that the following is a full and clear description thereof, reference being had to the accompanying drawings, and to the letters of reference marked thereon.

It is well known that street or so-called horse-cars, wagons, and similar vehicles, on uneven ground, and in stopping and starting, exert a jar upon the draught-animals, and that animals suffer thereby severely, and this jar is due to the rigid attachments of traces, and whiffle-trees, and car or wagon-pole to the vehicles.

To obviate said effects upon the draught-animals, the nature of my invention is in the use of rubber or similar springs in the car-pole, and, to retain the full usefulness of said springs, the same are housed and properly protected.

In order that the weight of the pole shall not be carried in an unduly burdensome manner by the draught-animal, this invention is in an adjustable rest-fork, which shall brace against the car or vehicle, and thus support, in greater or less degree, the pole.

To enable those skilled herein to make and use my said invention, I will now describe its construction and operation, referring to Figure 1 as a central sectional elevation, and to Figure 2 as a top plan of the ordinary form of my said pole, as used for street-cars and similar vehicles.

A represents the pole proper, usually of wood.

B is the lower draught-strap, usually of metal, having the eye $b$, to connect with the usual draught-bolt of the car or other vehicle.

On the upper edge of the pole, I arrange the guard-strap C, securing it, by screws or otherwise, to the pole.

Said strap C passes back, and is deflected to form an offset, $c$, and meets the draught-strap B at the rest-bolt D, which secures said parts B and C.

Within the space enclosed by the straps B and C, and at the rear end, I arrange the double-tree E.

This has an eye-plate, $e$, on its forward edge, through which the hinge-bolt F passes, leaving the double-tree free to turn on said bolt.

The bolt F is guided in the slots $f$ of the guard and draught-straps, and by the double-tree fitting between said straps another security against disconnection of said parts is effected.

In order, now, that the force exerted by draught-animals, or the resistance of the vehicle, may be flexible, I arrange, on said bolt F, the piston-rod G.

This passes within the cylinder H, being fitted to prevent any dust or moisture entering at the point $h$.

On said rod G, I arrange the piston G', which rests against a shoulder of the rod G, as shown in fig. 1; and about said piston G, and within the casing-cylinder H, I arrange a rubber or similar cushion, I, the rod G extending back into a slot, $g$, of the pole A, and being thus guided.

It will be seen that the horses or other animals, in drawing the double-tree forward, propel the hinge-bolt F and piston G G' against the rubber cushion, and thus avoid any sudden jar, and produce a gradual action of propulsion on the vehicle; and it is furthermore apparent that, by encasing the cushion I in the cylinder H, the same is preserved against ice, or moisture and dust, or other interfering substances which could affect its elasticity.

In order that the weight of the pole A, and its connected parts as aforesaid, may not bear too heavily upon the draught-animals, I have arranged an adjustable brace-rest, in the manner following:

I connect, to the draught-strap B or pole A, the brace-rod K. This passes below the strap B, and is held by the rest-bolt D extending down to it at K. The rear end of the brace K is arranged with a screw-nut, $l$, into which the rest or fork L passes, and is secured. This fork rests against the usual rest-bar on the forward end of a car or wagon.

In order to secure said parts against dust and moisture, the fork L fits, at its forward end $l^1$, nicely in the nut $l$, and the rear end of the fork L is cut down to a somewhat smaller diameter at $l^2$, and arranged with a screw-thread fitting the thread of the nut $l$. In this wise the threaded end $l^2$ is protected, and, at the same time, the connection of the parts finds a more perfect guide and support in the fit of the end $l^1$.

Having thus fully described my invention,

What I claim, is—

1. The pole A, slotted at $g$, straps B and C, and slots $f$, double-tree E, hinge-bolt F, rod G, piston G', cushion I, enclosing-cylinder H $h$, when combined and arranged substantially as and for the purpose set forth.

2. The rest-fork L, fitted at $l^1$, and having a screw-end $l^2$, and combined with nut $l$ of the brace K, substantially as and for the purposes set forth.

In witness whereof, I have hereunto set my hand, this 16th day of October, A. D. 1868, in the presence of—

T. PENDERGAST.

Witnesses:
  GEO. P. HERTHEL, Jr.,
  WM. W. HERTHEL.